Dec. 31, 1968   P. A. WALSH   3,419,736
EXTERNALLY CONTROLLED CAPACITOR CHARGING AND DISCHARGING CIRCUIT
Filed Aug. 4, 1966
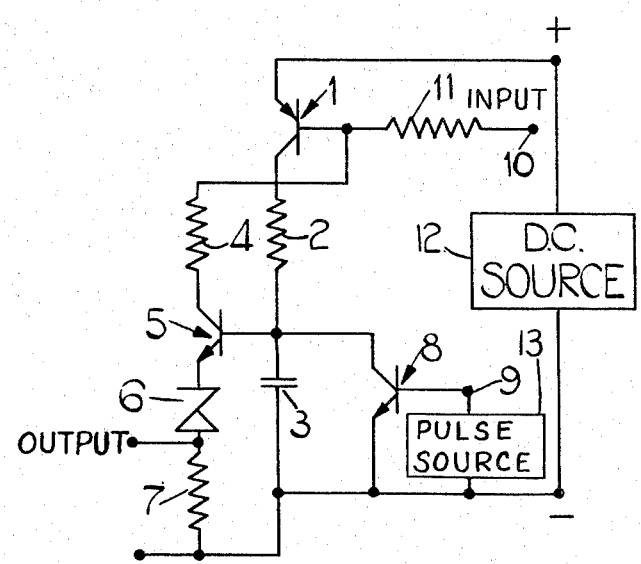

United States Patent Office 3,419,736
Patented Dec. 31, 1968

3,419,736
EXTERNALLY CONTROLLED CAPACITOR
CHARGING AND DISCHARGING CIRCUIT
Peter Alfred Walsh, Hemel Hempstead, England, assignor
to Rotax Limited, London, England
Filed Aug. 4, 1966, Ser. No. 570,313
Claims priority, application Great Britain, Aug. 31, 1965,
37,163/65
5 Claims. (Cl. 307—293)

ABSTRACT OF THE DISCLOSURE

An externally controlled capacitor charging and discharging circuit including a capacitor, charging means with which the capacitor can be charged from a source of supply at a rate dependent upon the magnitude of a control signal, switch means responsive to the voltage developed across the capacitor and arranged to switch on when said voltage attains a predetermined value, a resistor current flow through which is controlled by said switch means and across which an output voltage is developed, and further means arranged to discharge said capacitor at predetermined time intervals. Said further means also serves to switch off said switch means and thereby to interrupt the flow of current through said resistor and thereby cause the output voltage to fall to zero.

---

This invention relates to an externally controlled capacitor charging and discharging circuit and has for its object to provide such a circuit in a simple and convenient form.

A capacitor charging and discharging circuit in accordance with the invention comprises in combination, a capacitor, charging means through which the capacitor can be charged from a source of supply at a rate dependent upon the magnitude of a control signal, switch means responsive to the voltage developed across the capacitor and arranged to switch on when said voltage reaches a predetermined value, a resistor, current flow through which is controlled by said switch means and across which an output voltage is developed, and further means arranged to discharge said capacitor at predetermined time intervals, said further means also serving to switch off said switch means and thereby to interrupt the flow of current through said resistor.

One example of an externally controlled capacitor charging and discharging circuit in accordance with the invention will now be described with reference to the accompanying circuit diagram. Referring to the diagram there is provided a p-n-p transistor 1 having its emitter connected to the positive terminal of a source of DC supply 12 and its collector connected to the negative terminal of the supply through a resistor 2 and a capacitor 3 connected in series. The base of transistor 1 is connected through resistor 4 to the collector of n-p-n transistor 5, the emitter of which is connected to the negative terminal of the supply through Zener diode 6 and resistor 7. Moreover, the base of transistor 5 is connected to a point intermediate resistor 2 and capacitor 3 which point is also connected to the collector of n-p-n transistor 8 the emitter of which is connected to the negative terminal of the supply.

Furthermore, the base of transistor 8 is connected to terminal 9, and the base of transistor 1 is connected to terminal 10 through resistor 11.

In use, terminal 10 is connected to an external means so that base current flows in transistor 1. This causes a collector current with the result that capacitor 3 starts to charge at a rate depending on the magnitude of the current flowing into the base of transistor 1. The voltage across capacitor 3 rises until the Zener diode 6 breaks down thus causing collector current to flow in transistor 5. The flow of collector current in transistor 5 causes an increase in the flow of base current in transistor 1 which in turn further increases the base current of transistor 5. The result of this is that both transistors bottom and an output voltage across resistor 7 rises rapidly.

In order to return the output voltage to zero a positive going pulse is applied to terminal 9 and this causes transistor 8 to conduct. The flow of current in the collector emitter path of transistor 8 discharges the capacitor 3 and stops the flow of base current in transistor 5. Zener diode 6 therefore stops conducting and the output voltage falls to zero. When transistor 8 ceases to conduct transistor 1 charges up the capacitor and the process is repeated.

Conveniently, a train of pulses from a pulse source 13 is applied to terminal 9 and the interval between successive pulses is such that the capacitor can charge sufficiently to cause transistor 5 to conduct. If the pulse repetition rate is constant the mean value of the output voltage will be dependent upon the current flow in the external means providing of course that the current is sufficient to ensure that the capacitor charges sufficiently to produce breakdown of the Zener diode 6 during the interval between pulses. The external means may, for example, be a comparator which produces a nominal value of current for a zero error and which varies up or down depending on the error. The transistor 8 may be replaced by a relay or other device capable of discharging the capacitor.

Having thus described my invention what I claim as new and desire to secure by Letters Patent is:

1. An externally controlled capacitor charging and discharging circuit comprising a capacitor, charging means through which the capacitor can be charged from a source of supply at a rate dependent upon the magnitude of a control signal, a resistor across which an output voltage is developed, a Zener diode connected in series with said resistor, a first transistor the emitter path of which includes said resistor and said Zener diode, the base emitter circuit of said transistor being connected in parallel with said capacitor, said Zener diode being rendered conductive when the voltage across the capacitor attains a predetermined value thereby to cause current flow in and an output voltage to be developed across said resistor and further means arranged to discharge said capacitor at predetermined time intervals, said further means also serving to cause the Zener diode to cease conducting and thereby to interrupt the flow of currents through the resistor.

2. An externally controlled capacitor charging and discharging circuit according to claim 1 in which said charging means comprises a second transistor the collector emitter path of which is in series with said capacitor across said source of supply, said control signal being applied to the base of second transistor.

3. An externally controlled capacitor charging and discharging circuit according to claim 2 in which the collector of the first transistor is connected to the base of the second transistor.

4. An externally controlled capacitor charging and discharging circuit according to claim 3 in which said switch means comprises a third transistor having its collector emitter path connected in parallel with the capacitor.

5. An externally controlled capacitor charging and discharging circuit according to claim 4 including a pulse source for controlling the third transistor, said pulse source serving to switch said third transistor on at predetermined time intervals to discharge the capacitor, the off periods of the transistor being sufficiently long to allow the capacitor to charge to a voltage sufficient to cause breakdown of the Zener diode whereby the mean voltage developed across said resistor will vary in accordance with the magnitude of said control signal.

References Cited
UNITED STATES PATENTS

| | | | |
|---|---|---|---|
| 2,892,101 | 6/1959 | Bright | 307—293 |
| 2,949,545 | 8/1960 | White | 307—293 |
| 2,998,532 | 8/1961 | Smeltzer | 307—293 |

JOHN S. HEYMAN, *Primary Examiner.*

U.S. Cl. X.R.

307—247, 246, 285, 273